United States Patent
Byron et al.

(10) Patent No.: US 11,164,473 B2
(45) Date of Patent: Nov. 2, 2021

(54) GENERATING PROBING QUESTIONS TO TEST ATTENTION TO AUTOMATED EDUCATIONAL MATERIALS

(71) Applicant: International Business Machines Corporation, Armonk, NY (US)

(72) Inventors: Donna K. Byron, Petersham, MA (US); Carmine Dimascio, West Roxbury, MA (US); Florian Pinel, New York, NY (US); Benjamin Luke Johnson, Baltimore City, MD (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/278,569

(22) Filed: Feb. 18, 2019

(65) Prior Publication Data
US 2020/0265735 A1    Aug. 20, 2020

(51) Int. Cl.
*G09B 5/08* (2006.01)
*G06F 9/451* (2018.01)

(52) U.S. Cl.
CPC .............. *G09B 5/08* (2013.01); *G06F 9/451* (2018.02)

(58) Field of Classification Search
CPC .............. G09B 7/00; G09B 5/12; G09B 5/00
See application file for complete search history.

(56) References Cited

U.S. PATENT DOCUMENTS

| | | | |
|---|---|---|---|
| 5,944,530 A | 8/1999 | Ho et al. | |
| 9,740,985 B2 | 8/2017 | Byron et al. | |
| 2009/0202969 A1* | 8/2009 | Beauchamp | G06N 5/02 434/335 |
| 2010/0050236 A1* | 2/2010 | Miller | G16H 40/40 726/3 |
| 2014/0193795 A1* | 7/2014 | Tavolacci | G09B 7/02 434/362 |
| 2014/0335498 A1* | 11/2014 | Muthukumarasamy | G09B 7/00 434/350 |
| 2015/0179082 A1* | 6/2015 | Byron | G09B 7/00 434/322 |
| 2016/0148114 A1* | 5/2016 | Allen | G06N 5/02 706/11 |
| 2016/0203726 A1* | 7/2016 | Hibbs | G09B 7/02 434/308 |
| 2018/0005539 A1 | 1/2018 | Chatow et al. | |
| 2018/0096619 A1 | 4/2018 | Fuka | |
| 2018/0197425 A1 | 7/2018 | Lamb | |
| 2021/0005305 A1* | 1/2021 | Lee | A61B 5/12 |

OTHER PUBLICATIONS

Wikipedia, "Computerized Adaptive Testing"—https://en.wikipedia.org/wiki/Computerized_adaptive_testing.
(Continued)

*Primary Examiner* — Justin S Lee
(74) *Attorney, Agent, or Firm* — Heather Johnston (57) ABSTRACT

A method, apparatus and program product utilize an automated educational tool to generate or modify one or more multiple choice questions in a question set in connection with tracking a user's attention state to dynamically vary the difficulty of a user assessment performed by the automated educational tool and thereby encourage the user to pay greater attention to the material being presented to the user.

19 Claims, 4 Drawing Sheets

(56) References Cited

OTHER PUBLICATIONS

Alsubait, Tahani Mohammad, "Ontology-based multiple-choice question generation", Thesis to University of Manchester, 2015, https://www.research.manchester.ac.uk/portal/files/55558272/FULL_TEXT.pdf.

Mitkov, Ruslan, and Le An Ha. "Computer-aided generation of multiple-choice tests." Proceedings of the HLT-NAACL 03 workshop on Building educational applications using natural language processing—vol. 2. Association for Computational Linguistics, 2003—https://aclanthology.info/pdf/W/W03/W03-0203.pdf.

Papasalouros, Andreas, Konstantinos Kanaris, and Konstantinos Kotism "Automatic Generation of Multiple Choice Questions From Domain Ontologies." e-Learning. 2008, University of Aegean, Samos, Greece—http://citeseerx.ist.psu.edu/viewdoc/download?doi=10.1.1.218.5149&rep=rep1&type=pdf.

Al-Yahya, Maha. "Ontology-based multiple choice question generation." The Scientific World Journal 2014—http://downloads.hindawi.com/journals/tswj/2014/274949.pdf.

Li, Jiwei, et al. "Adversarial Learning for Neural Dialogue Generation", Stanford University,CA, New York University, NY, and Ohio State University, OH, https://arxiv.org/pdf/1701.06547.pdf.

\* cited by examiner

GENERATING PROBING QUESTIONS TO TEST ATTENTION TO AUTOMATED EDUCATIONAL MATERIALS

BACKGROUND

Online and other computer-implemented tools are increasingly used for training and educational purposes, and in some instances such tools include embedded assessment functionality that periodically quizzes students to assess their understanding of the presented material. Such embedded assessment functionality may also be used for tasks such as pre-employment screening, micro-work auditions, continuing education, etc. Embedded assessment in many instances is based around presenting a user with one or more multiple choice questions, where a user is presented with a question and multiple predetermined answers from which a user is required to select one or more when answering the question. Multiple choice questions are preferred in many instances because they require less input from a user and because unlike fill in the blank type answers there is generally no ambiguity as to whether a user has answered the question correctly or incorrectly so validation of a user's answer is greatly simplified.

One challenge associated with multiple choice questions, however, is that of ensuring that the level of difficulty of the questions is appropriate for validating that the user is learning the material being presented. Questions that are too difficult for a user may lead to user frustration, while questions that are too simple can in some instances be answered by users without actually attending to the presented materials or fully knowing the material, or may be too easy to guess based upon patterns that exist in the question set. Multiple choice questions are generally formulated with one or more correct answers and one or more incorrect or "distractor" answers, and if the semantics of the distractors are very far from the correct answers, one generally doesn't have to read very closely to choose the correct answer. The questions are sometimes either too straightforward and/or include "giveaway" phrasing, or the distractors on multiple choice questions aren't feasible as valid answers. Moreover, the author of educational materials may have less interest in authoring questions, so the questions may not be as carefully crafted as the material itself.

Therefore, a significant need exists in the art for a manner of formulating question sets to ensure that users who provide correct answers to such questions set do so based on the material they're being quizzed on vs. guessing based on patterns.

SUMMARY

According to an embodiment of the present invention, an apparatus, a program product, and a method of presenting educational material may analyze educational material to be presented to a user and generate therefrom one or more inattentive user assessment questions associated with the educational material, present the educational material to the user, perform a user assessment during presentation of the educational material to assess the user's understanding of the educational material, monitor user attention during presentation of the educational material, and in response to detection of an inattentive state for the user when monitoring user attention, dynamically increase a difficulty of the user assessment by presenting the one or more inattentive user assessment questions to the user.

In some embodiments, generating the one or more inattentive user assessment questions is performed dynamically during presentation of the educational material to the user. Also, in some embodiments, generating the one or more inattentive user assessment questions is performed prior to presentation of the educational material to the user. Further, in some embodiments, generating the one or more inattentive user assessment questions includes generating a new question from the educational material.

In some embodiments, generating the new question includes parsing the educational material, extracting one or more entities and one or more relationships from the parsed educational material, and generating the new question based upon the extracted one or more entities and one or more relationships. In addition, in some embodiments, generating the new question includes applying at least a portion of the educational material to a question answer pipeline.

In some embodiments, generating the one or more inattentive user assessment questions includes modifying an existing question included in the educational material. In addition, in some embodiments, modifying the existing question includes making the existing question more difficult. Moreover, in some embodiments, modifying the existing question includes generating one or more near-match distractor answers. In some embodiments, modifying the existing question includes generating one or more wrong answers similar to one or more correct answers. Moreover, in some embodiments, modifying the existing question includes extracting a number and polarity of correct answers to the existing question. In some embodiments, modifying the existing question includes training a machine learning model to predict answer correctness in a question set associated with the educational material.

In addition, in some embodiments, monitoring user attention includes tracking user interaction with a mouse, tracking user interaction with a keyboard, tracking user interaction with a touchscreen display, tracking user eye movement, tracking user interaction with one or more applications, or tracking user interaction with one or more windows.

In some embodiments, dynamically increasing the difficulty of the user assessment includes selecting the one or more inattentive user assessment questions from a question set. Moreover, in some embodiments, dynamically increasing the difficulty of the user assessment includes dynamically generating the one or more inattentive user assessment questions as modifications of one or more existing questions in a question set. In addition, some embodiments may further include evaluating the one or more inattentive user assessment questions by presenting the one or more inattentive user assessment questions to a second user not determined to be in an inattentive state.

Some embodiments may also include presenting the one or more inattentive user assessment questions to the user during the user assessment, receiving one or more answers from the user, and taking a corrective action in response to the one or more answers received from the user being incorrect. In addition, in some embodiments, taking the corrective action includes restarting a predetermined portion of the presentation.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

In various embodiments consistent with the invention, and as will become more apparent below, an automated educational tool may generate or modify one or more multiple choice questions in a question set in connection with tracking a user's attention state to dynamically vary the difficulty of a user assessment performed by the automated educational tool and thereby encourage the user to pay greater attention to the material being presented to the user. Doing so may accordingly facilitate the learning process for both users that are inclined to pay attention to the material as well as those who are not, as the difficulty of the questions presented to a user may be based in part on user attention rather than just whether or not the user is answering the questions correctly. In some embodiments, for example, a user assessment consisting of one or more multiple choice questions may be dynamically modified while tracking the user's attention state, e.g., by modifying question wording, inserting extra questions, or adding incorrect answer confounds to existing question sets. The inserted questions or the questions with additional answers may be configured to be more difficult to answer properly unless one has actually read and understood the material, and as such, a user may be encouraged to pay better attention to the material during its presentation.

Figure 1:
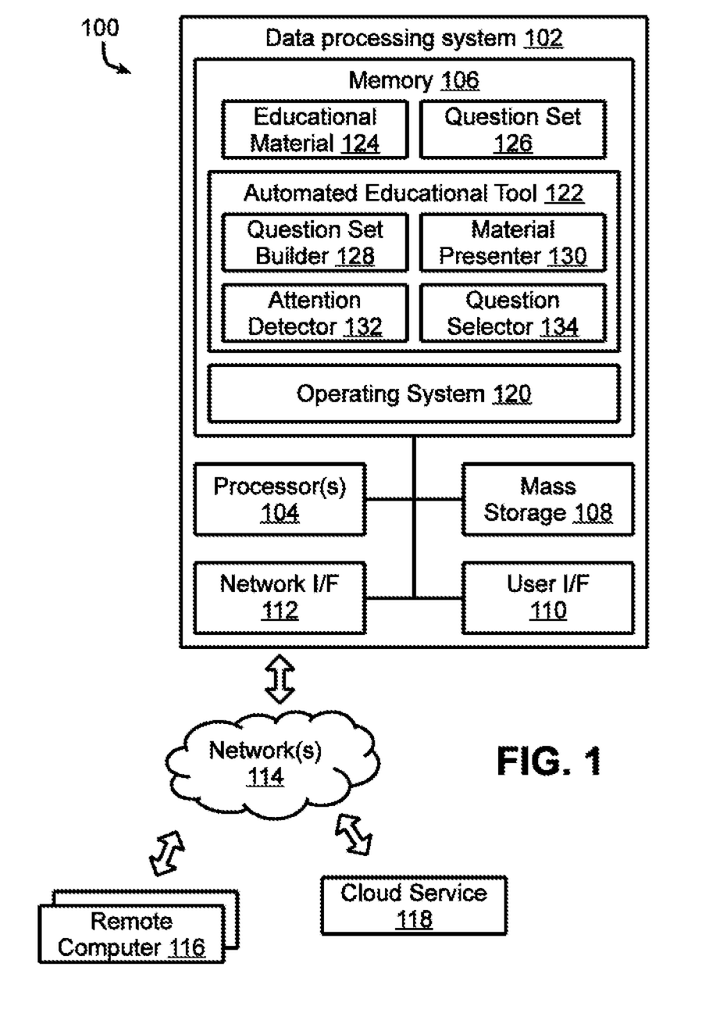
FIG. 1 is a block diagram of an example data processing system incorporating a training application consistent with the invention.

Referring now to the Drawings, wherein like numbers denote like parts throughout the several views, FIG. 1 illustrates an example hardware and software environment 100 within which the techniques described herein may be implemented in some embodiments of the invention. A data processing system 102 may include one or more hardware-implemented processors 104, each of which may be implemented as a single or multi-threaded processor and/or as a single or multi-core processor, as well as a memory 106, which may be considered to include one or more levels of memory devices, e.g., a DRAM-based main storage, as well as one or more levels of data, instruction and/or combination caches, with certain caches either serving individual processors or multiple processors as is well known in the art. In the illustrated embodiment, for example, memory 106 may include a volatile memory. In addition, the memory 106 of data processing system 102 may be considered to include memory storage physically located elsewhere in data processing system 102, e.g., any cache memory in a processor, as well as any storage capacity used as a virtual memory, e.g., as stored on a mass storage device or on another computer coupled to data processing system 102.

In addition, in the illustrated embodiment, data processing system 102 may include additional hardware components, e.g., one or more mass storage devices 108 (e.g., internal and/or external hard disk and/or solid state drives, a storage area network, network attached storage, etc.), a user interface 110 incorporating one or more user input/output devices (e.g., a keyboard, a pointing device, a display, a printer, etc.), and one or more network interfaces 112 interfacing the data processing system to one or more networks 114, e.g., to facilitate interaction between data processing system 102 and one or more remote computers 116 and/or cloud services 118.

Data processing system 102 operates under the control of one or more kernels, hypervisors, operating systems (e.g., operating system 120), etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to data processing system 102 via network, e.g., in a distributed or client-server computing environment, whereby the processing required to implement the functions of a computer program may be allocated to multiple computers over a network. Thus, for example, data processing system 102 may include a cluster or other networked combination of computers in some embodiments. Moreover, data processing system 102 may implement virtualization in some embodiments, whereby the functionality implemented by data processing system 102 may be implemented in one or more virtual machines resident on one or more physical hardware nodes of a cloud-based or server-based data processing system.

In some embodiments of the invention, the techniques described herein may be implemented in an automated educational tool 122 resident in data processing system 102 and having access to educational material 124 and a question set 126. As will become more apparent below, automated educational tool 122 may include one or more functional modules for implementing the various techniques described herein, e.g., a question set builder module 128, a material presenter module 130, an attention detector module 132 and a question selector module 134. Additional software components may also be resident in data processing system 102, and the functionality described herein may be implemented within other combinations of modules in other embodiments.

It will also be appreciated that the invention described herein may be a system, a method, and/or a computer program product in various embodiments. The computer program product may include a computer readable storage medium (or media) having computer readable program instructions thereon for causing one or more processors to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 3:
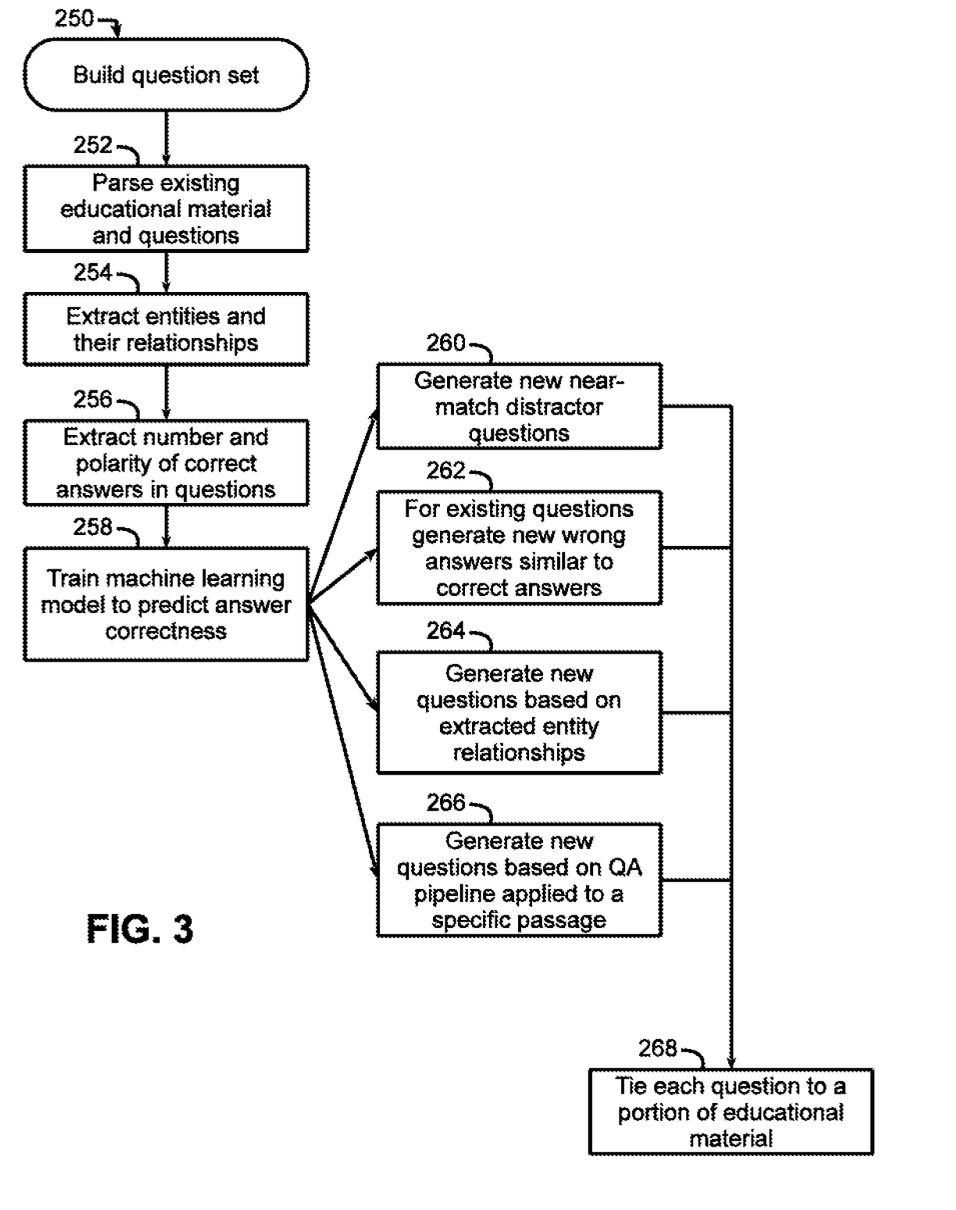
FIG. 3 is a flowchart illustrating an example sequence of operations for the build question set block referenced in FIG. 2.

Those skilled in the art will recognize that the example environment illustrated in FIG. 3 is not intended to limit the invention. Indeed, those skilled in the art will recognize that other alternative hardware and/or software environments may be used without departing from the scope of the invention.

Now turning to an example embodiment of automated educational tool 122, as noted above, tool 122 may include various modules in some embodiments, e.g., a question set builder module 128, a material presenter module 130, an attention detector module 132 and a question selector module 134, and may access educational material 124 and a question set 126. Tool 122 may be implemented in some embodiments at least in part in a presentation device such as a desktop or laptop computer, a tablet, a projector, a mobile device, etc., while in some embodiments at least a portion of the functionality of tool 122 may be implemented in a multi-user device such as a server, a cloud service, a data center, etc.

The various modules of automated education tool 122 may be configured to analyze educational material and generate therefrom one or more inattentive user assessment questions associated with the educational material, present the educational material to the user, perform a user assessment during presentation of the educational material to assess the user's understanding of the educational material, monitor user attention during presentation of the educational material, and in response to detection of an inattentive state for the user when monitoring user attention, dynamically increase a difficulty of the user assessment by presenting the one or more inattentive user assessment questions to the user.

Educational material 124 may include various content to be presented to a user, including alphanumeric information, images, sounds, videos, animations, etc. In addition, question set 126 may include a set of questions and associated answers associated with the educational material, at least a portion of which may include multiple choice questions and associated correct and incorrect (distractor) answers. In some embodiments, at least a portion of the question set may be initially provided with the educational material, e.g., where the question set is initially generated by one or more authors of the educational material. In other embodiments, however, no questions may be provided with the educational material and the question set may be automatically generated from the educational material.

Question set builder module 128 may be used in some embodiments to generate one or more questions in question set 126 based upon the educational material, e.g., by analyzing the educational material and generating questions therefrom in an automated manner using natural language processing. In some embodiments, however, question set builder module 128 may be used to modify one or more pre-existing questions in question set 126, e.g., to increase the difficulty of such questions for the purpose of dynamically increasing the difficulty of a user assessment performed during presentation of the educational material to a user. It will be appreciated that in some embodiments a modified question may replace the question from which it is generated in question set 126, while in other embodiments the modified question may be added to the question set such that both the pre-existing question and the modified question are included in the question set. Thus, in some embodiments question set builder module 128 may generate all questions in question set 126 and in other embodiments may generate only a portion of the questions in question set 126. Regardless, however, one or more of the generated questions may be referred to herein as inattentive user assessment questions as these questions are purposefully generated to be more difficult to answer by an inattentive user.

Material presenter module 130 may be used to present the educational material to one or more users. The presentation may be performed on a computer display and may include audio material in addition to visual material. The presentation may be organized into multiple sections and may be interrupted by user assessments in some embodiments to enable a user to be quizzed or tested on material that has already been presented to the user. The user assessments may be performed periodically, at regular intervals, or based upon section breaks included in the educational material in some embodiments, while in other embodiments the user assessments may be timed dynamically, e.g., based upon detection of a user's inattentiveness.

Attention detector module 132 may be used to monitor a user's attentiveness during a presentation of the educational material for the purpose of detecting an inattentive state for a user. Various manners of monitoring a user's attentiveness may be used in different embodiments, e.g., by tracking user interaction with a mouse, tracking user interaction with a keyboard, tracking user interaction with a touchscreen display, tracking user interaction with one or more applications, and/or tracking user interaction with one or more windows. Further, when suitable hardware is available to monitor a user independent of the user's interaction with a presentation device, e.g., via an eye tracking device or a digital camera, a user's attention may be monitored, for example, by eye tracking, image analyses of an image of the user while interacting with the presentation device, etc. It will be appreciated that various metrics may be used to detect whether or not an inattentive state exists for a user, e.g., based upon the amount or percentage of the time the user is determined to have not been paying attention or paying attention to something other than the educational material being presented (e.g., if the user is determined to not be paying attention for a duration of two minutes, for three minutes of a ten minute presentation, for 25% of a presentation, etc.)

Question selector module 134 may be used to select one or more questions to present to a user during a user assessment performed by material presenter module 130. As will be discussed in greater detail below, question selector module 134 may dynamically vary the difficulty of a user assessment based upon the monitoring performed by attention detector module 132, e.g., to select more difficult questions from question set 126 such as by including one or more inattentive user assessment questions in the user assessment.

Figure 2:
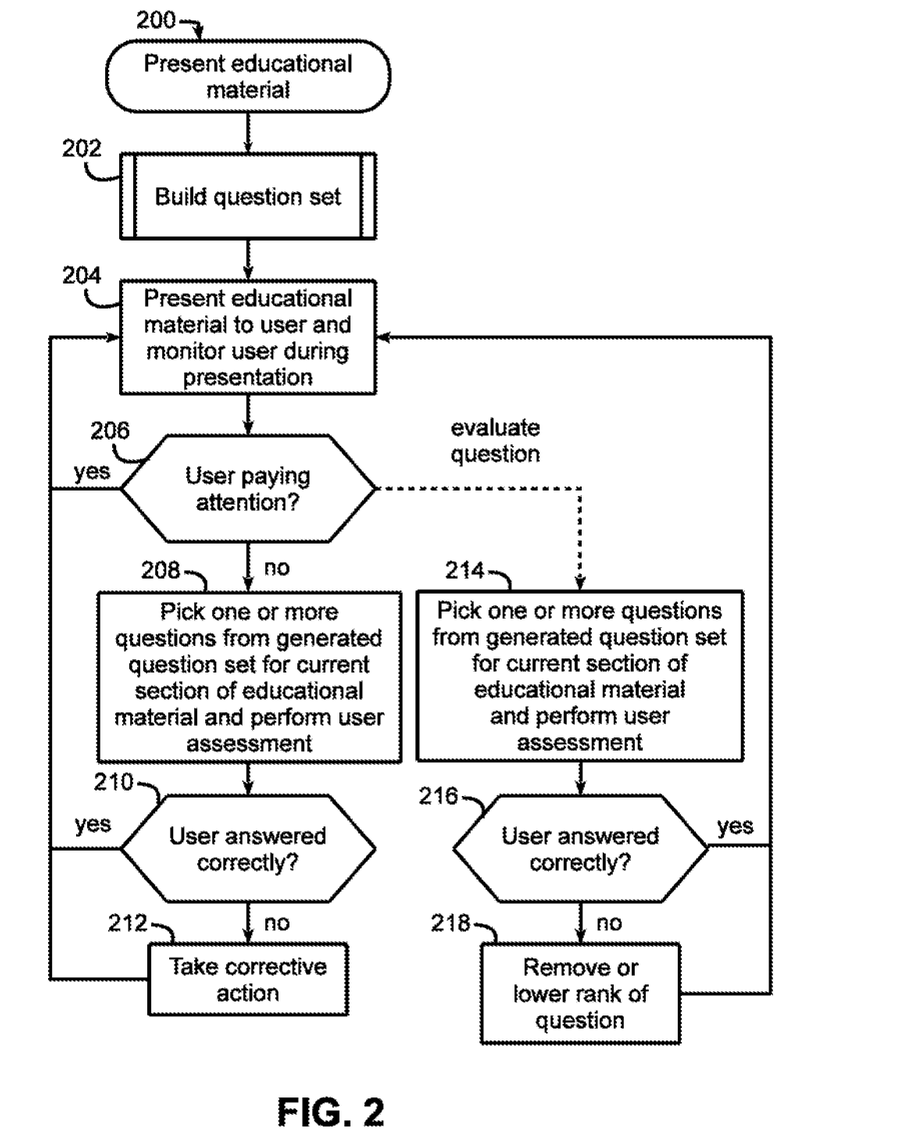
FIG. 2 is a flowchart illustrating an example sequence of operations for presenting educational material using the data processing system of FIG. 1.

Now turning to FIG. 2, an example sequence of operations for presenting educational material using automated educational tool 122 is illustrated at 200. In this sequence of operations a question set is initially built in block 202, including one or more inattentive user assessment questions included therein. The question set may be built by augmenting a pre-existing question set included with the educational materials, or may be generated from the educational material directly. Moreover, the question set may be generated immediately prior to presenting the educational material and/or may be individually generated for the presentation and/or user in some embodiments, while in other embodiments the question set may be generated well prior to the presentation, and may be used to generate questions irrespective of any particular user or presentation, and may even be performed by a different computer or device from that which presents the educational material. Further details regarding building the question set are provided in connection with FIG. 3 below.

Next, in block 204, the educational material is presented to a user, and during the presentation, the user's attentiveness is monitored. The presentation may be self-guided by a user in some embodiments, e.g., by selecting "next" buttons to progress through portions of the material or otherwise interacting with various interactive elements of the presentation, while in other embodiments the presentation may progress independent of user input, e.g., as might be the case with an audio or video presentation. Block 206 determines whether the user is paying attention during the presentation, and if so, returns control to block 204 to continue presenting the educational material. If the user is not paying attention (i.e., an inattentive state is detected for the user), block 206 passes control to block 208 to interrupt the presentation and perform a user assessment. In connection with doing so, one or more questions are picked from the generated question set, and in the illustrated embodiment, the one or more questions include one or more inattentive user assessment questions generated to query the inattentive user, thereby dynamically increasing the difficulty of the user assessment. In performing the user assessment, the user may be presented with one or more questions in sequence or in a group, and the user may respond with answers to the one or more questions.

Next, block 210 determines whether the user answered the question(s) correctly, and if so, returns control to block 204 to continue presenting the material. If not, however, block 210 passes control to block 212 to take a corrective action. In some embodiments, the corrective action may be to require the user to restart the current section of the educational material, while in other embodiments, other actions may be taken, e.g., querying the user to restart the current section, warning the user that he or she is not paying attention sufficiently, providing additional material about the missed question(s), presenting additional questions to the user, shortening a time period to a next user assessment, etc. Control then returns to block 204 to continue to present the material, optionally going back to an earlier point in the presentation.

Returning to block 206, it may also be desirable in some embodiments to evaluate generated questions from the generated question set by having a user that is determined to not be inattentive answer one or more of such questions. In such instances, block 206 may optionally pass control to block 214 to interrupt the presentation and perform a user assessment. In connection with doing so, one or more questions are picked from the generated question set, and in the illustrated embodiment, the one or more questions include one or more inattentive user assessment questions generated to query the inattentive user to enable such questions to be evaluated. In performing the user assessment, the user may be presented with one or more questions in sequence or in a group, and the user may respond with answers to the one or more questions.

Next, block 216 determines whether the user answered the question(s) correctly, and if so, returns control to block 204 to continue presenting the material. If not, however, block 216 passes control to block 218 to remove the incorrectly answered question(s) from the question set or otherwise lower the rank(s) of the question(s) so that any questions that are inconsistently answered by attentive users are eventually removed. Control then returns to block 204 to continue to present the material.

Now turning to FIG. 3, an example sequence of operations for building a question set (e.g., as is performed in block 202 of FIG. 2) is illustrated at 250. In block 252, the existing educational material and questions (if included in the educational material) may be parsed, e.g., using natural language processing (NLP) parsers, to parse the material into various entities, e.g., to break down background stories, questions, and answers. In block 254, entities and their relationships may be extracted, e.g., to collect person names, roles, company names, locations, etc. In addition, when images are available, it may also be desirable to generate text descriptions of the images. Next, in block 256, if questions are included in the material, the number and polarity of correct answers in the questions may be extracted. For example, where a question is phrased in terms of "select all answers that are false," the question may be designated as a "multi-select" question with a polarity of false, whereas where a question in phrased in terms of "what is the best choice of action," the question may be designated as a "single select" question with a polarity of true.

Next, in block 258, a machine learning model may be trained, e.g., using supervised learning (e.g., a decision tree) to determine if certain features of the answers have created a strong bias toward correct or incorrect status, e.g., where incorrect answers repeat wordings such as 'conflict of interest' or modality markers such as 'should.' In addition, a set of strong predictor vocabulary for either correct or incorrect answers may also be generated at this time, thereby identifying giveaways or clues in the material and/or pre-existing questions.

Next, in blocks 260-266 one or more "difficult" or inattentive user assessment questions may be generated for the question set using one or more of the different techniques illustrated in FIG. 3. For example, as illustrated in block 260, it may be desirable in some embodiments to generate one or more "near-match" distractor questions. For example, an existing question may be duplicated but with one or more distractor or incorrect answers replaced with newly-generated answers where the names of entities such as people, companies, or locations are replaced with other names that may or may not be in the material. As another example, new answers that reverse the polarity of the expected answers may be added to a question or to a copy of a question, such that if the question asks for a positive response, distractors may be added with language from negative answers, e.g. "Sally shouldn't have done this because this is a conflict of interest." In some instances, sentiment analysis may be used to define dispreferred actions. As another example, new answers may be generated by using antonyms, identifying words that regularly occur in right answers ("unacceptable", "should not") and wrong answers ("just needs to", "it is okay") and swapping them. As yet another example, new answers may be generated by negating correct answers.

As another example, as illustrated in block 262, existing questions may be modified by generating and adding new wrong answers similar to correct answers. It will be appreciated that the wording of wrong answers often makes it obvious that they are incorrect ("just needs to", "it is okay"), so by either using direct replacement of terms or generation of synthetic answers, new confounds or distractors may be created. In addition, in some embodiments, adversarial networks such as SEQ2SEQ models may be trained to change the wording of an answer to make it sound like the correct answer. In such embodiments, the original question answers may be used as training data to train a classifier that predicts whether an answer is incorrect based on the words it contains. Then this classifier may be used as a discriminative model to train a model that will be used as a generative model.

As yet another example, as illustrated in block 264, additional new questions may be generated based upon extracted entity relationships from the material, e.g., by turning sentences from a background story into questions, or when images are available, turning image descriptions into questions. Questions may be purely attention-focused instead of dealing with the learning material in some embodiments, e.g., by asking "Who is Sally?", "What's the color of John's shirt?" or other types of questions where knowledge of the material is of less importance than attentiveness.

In other instances, however, a more nuanced question may be generated from approximately the same point in the presentation materials as other questions. For example, as illustrated in block 266, in some embodiments a Question Answer (QA) pipeline may be used to surface answer passages, generate a correct answer and generate new distractors from the nearby material.

For any generated questions, the questions may be specifically tied to particular portions or sections of the educational material as illustrated in block 268. As such, whenever inattentiveness is detected at a particular point in a presentation, one or more questions tied to that point of the presentation may be accessed for use in a user assessment.

Figure 4:
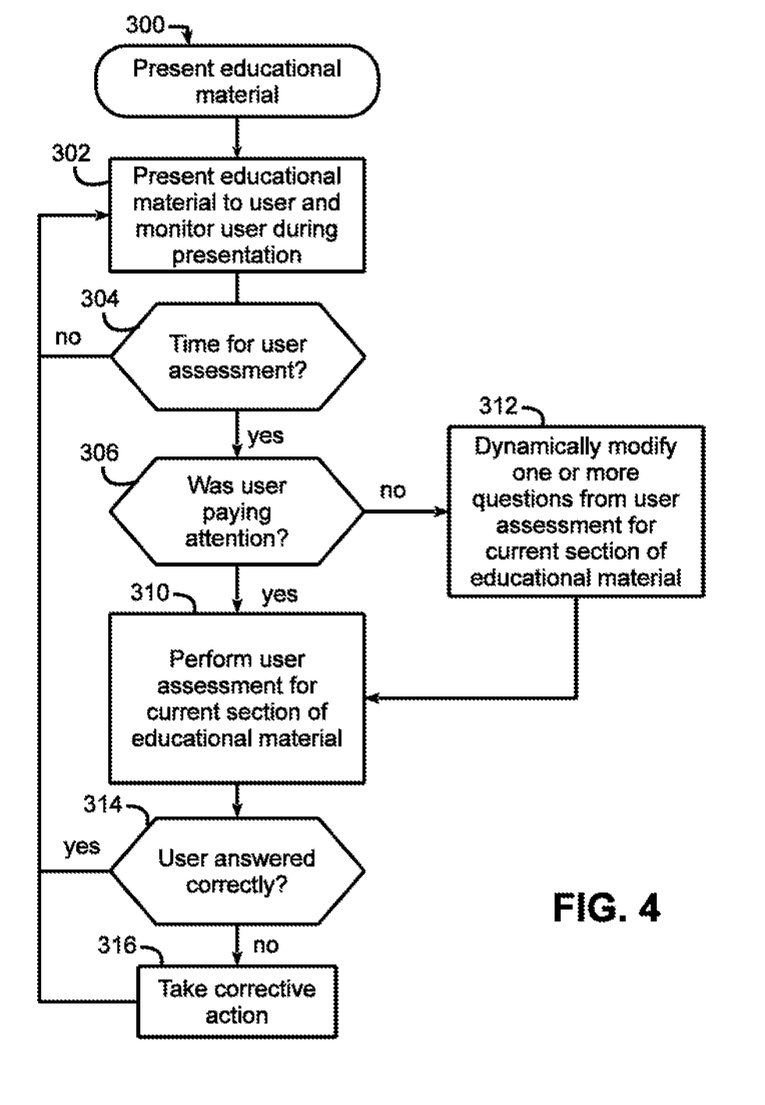
FIG. 4 is a flowchart illustrating another example sequence of operations for presenting educational material using the data processing system of FIG. 1.

Returning briefly to FIG. 2, it will be appreciated that in this sequence of operations the question set is illustrated as being built prior to presenting material to a user, and that user assessments are generally triggered only when inattentiveness is detected. In other embodiments, however, it may be desirable to periodically perform user assessments and/or dynamically generate inattentive user assessment questions during a presentation. FIG. 4, for example, illustrates another sequence of operations 300 for presenting educational material.

In block 302, for example, the educational material is presented to a user, and during the presentation, the user's attentiveness is monitored. Block 304 then determines when it is time for a user assessment (e.g., after a certain number of minutes, upon reaching a particular point in the material such as an end of a section, etc.), and if not, returns control to block 302 to continue the presentation.

If so, however, control passes to block 306 to determine whether the user was paying attention during the preceding portion of the presentation, and if so, control passes to block 310 to perform a user assessment, e.g., by presenting one or more questions from a question set (e.g., a pre-existing question set included with the material) to test the user's grasp of the recent section of the material. The question set, for example, may include a predetermined set of questions to be presented to a user as a user assessment for a particular section of the material.

If not, however, block 306 may instead pass control to block 312 to dynamically modify one or more questions from the question set (e.g., one or more questions selected for a user assessment for the current section of the material). The dynamic modification may be used to increase the difficulty of the user assessment, e.g., by generating one or more difficult or inattentive user assessment questions using any of the techniques described above in connection with FIG. 3. Control then passes to block 310 to perform the user assessment, but doing so using one or more dynamically-modified questions generated in block 312.

Next, block 314 determines whether the user answered the question(s) correctly, and if so, returns control to block 302 to continue presenting the material. If not, however, block 314 passes control to block 316 to take a corrective action. In some embodiments, the corrective action may be to require the user to restart the current section of the educational material, while in other embodiments, other actions may be taken, e.g., querying the user to restart the current section, warning the user that he or she is not paying attention sufficiently, providing additional material about the missed question(s), etc. Moreover, it will be appreciated that different actions may be performed in block 316 depending upon whether or not the user was determined to have been in an inattentive user state, e.g., to only require a section to be restarted for inattentive users. Control then returns to block 302 to continue to present the material, optionally going back to an earlier point in the presentation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of presenting educational material, the method comprising:
   using at least one processor, analyzing educational material to be presented to a user and generating therefrom one or more inattentive user assessment questions associated with the educational material;
   using at least one processor, presenting the educational material to the user;
   using at least one processor, performing a user assessment during presentation of the educational material to assess the user's understanding of the educational material;
   using at least one processor, monitoring user attention during presentation of the educational material;
   in response to detection of an inattentive state for the user when monitoring user attention, dynamically increasing a difficulty of the user assessment by presenting the one or more inattentive user assessment questions to the user; and
   evaluating the one or more inattentive user assessment questions by presenting the one or more inattentive user assessment questions to a second user not determined to be in an inattentive state.

2. The method of claim 1, wherein generating the one or more inattentive user assessment questions is performed dynamically during presentation of the educational material to the user.

3. The method of claim 1, wherein generating the one or more inattentive user assessment questions is performed prior to presentation of the educational material to the user.

4. The method of claim 1, wherein generating the one or more inattentive user assessment questions includes generating a new question from the educational material.

5. The method of claim 4, wherein generating the new question includes:
   parsing the educational material;
   extracting one or more entities and one or more relationships from the parsed educational material; and
   generating the new question based upon the extracted one or more entities and one or more relationships.

6. The method of claim 4, wherein generating the new question includes applying at least a portion of the educational material to a question answer pipeline.

7. The method of claim 1, wherein generating the one or more inattentive user assessment questions includes modifying an existing question included in the educational material.

8. The method of claim 7, wherein modifying the existing question includes making the existing question more difficult.

9. The method of claim 7, wherein modifying the existing question includes generating one or more near-match distractor answers.

10. The method of claim 7, wherein modifying the existing question includes generating one or more wrong answers similar to one or more correct answers.

11. The method of claim 7, wherein modifying the existing question includes extracting a number and polarity of correct answers to the existing question.

12. The method of claim 7, wherein modifying the existing question includes training a machine learning model to predict answer correctness in a question set associated with the educational material.

13. The method of claim 1, wherein monitoring user attention includes tracking user interaction with a mouse, tracking user interaction with a keyboard, tracking user interaction with a touchscreen display, tracking user eye movement, tracking user interaction with one or more applications, or tracking user interaction with one or more windows.

14. The method of claim 1, wherein dynamically increasing the difficulty of the user assessment includes selecting the one or more inattentive user assessment questions from a question set.

15. The method of claim 1, wherein dynamically increasing the difficulty of the user assessment includes dynamically generating the one or more inattentive user assessment questions as modifications of one or more existing questions in a question set.

16. The method of claim 1, further comprising:
presenting the one or more inattentive user assessment questions to the user during the user assessment;
receiving one or more answers from the user; and
taking a corrective action in response to the one or more answers received from the user being incorrect.

17. The method of claim 16, wherein taking the corrective action includes restarting a predetermined portion of the presentation.

18. An apparatus, comprising:
at least one processor; and
program code configured upon execution by the at least one processor to present educational material by:
analyzing educational material to be presented to a user and generating therefrom one or more inattentive user assessment questions associated with the educational material;
presenting the educational material to the user;
in response to detection of an inattentive state for the user when monitoring user attention, dynamically increasing a difficulty of the user assessment by presenting the one or more inattentive user assessment questions to the user; and
evaluating the one or more inattentive user assessment questions by presenting the one or more inattentive user assessment questions to a second user not determined to be in an inattentive state.

19. A program product, comprising:
a non-transitory computer readable medium; and
program code stored on the non-transitory computer readable medium and configured upon execution by at least one processor to present educational material by:
analyzing educational material to be presented to a user and generating therefrom one or more inattentive user assessment questions associated with the educational material;
presenting the educational material to the user;
performing a user assessment during presentation of the educational material to assess the user's understanding of the educational material;
monitoring user attention during presentation of the educational material;
in response to detection of an inattentive state for the user when monitoring user attention, dynamically increasing a difficulty of the user assessment by presenting the one or more inattentive user assessment questions to the user; and
evaluating the one or more inattentive user assessment questions by presenting the one or more inattentive user assessment questions to a second user not determined to be in an inattentive state.

\* \* \* \* \*